US007971687B2

(12) United States Patent
Alves et al.

(10) Patent No.: US 7,971,687 B2
(45) Date of Patent: Jul. 5, 2011

(54) ELEVATOR BELT ASSEMBLY WITH NOISE REDUCING GROOVE ARRANGEMENT

(75) Inventors: Goldino Alves, South Windsor, CT (US); Ary Mello, Farmington, CT (US); Xiaodong Luo, South Windsor, CT (US); Bill Perron, Bristol, CT (US); Hugh O'Donnell, Longmeadow, MA (US); Paul von Hardenberg, Farmington, CT (US); Mark Marler, Glastonbury, CT (US); John Pitts, Avon, CT (US); Randy Roberts, Hebron, CT (US); Hubert E. Goeser, Dannenberg (DE); Christoph Bederna, Fuhrenweg (DE)

(73) Assignees: Otis Elevator Company, Farmington, CT (US); ContiTech Antriebssysteme GmbH (DE)

( * ) Notice: Subject to any disclaimer, the term of this patent is extended or adjusted under 35 U.S.C. 154(b) by 1215 days.

(21) Appl. No.: 10/543,949

(22) PCT Filed: Feb. 7, 2003

(86) PCT No.: PCT/US03/03745
§ 371 (c)(1),
(2), (4) Date: Aug. 1, 2005

(87) PCT Pub. No.: WO2004/071925
PCT Pub. Date: Aug. 26, 2004

(65) Prior Publication Data
US 2006/0175137 A1 Aug. 10, 2006

(51) Int. Cl.

| | |
|---|---|
| ***B66B 11/04*** | (2006.01) |
| ***B66B 11/08*** | (2006.01) |
| ***F16G 1/00*** | (2006.01) |
| ***F16G 5/00*** | (2006.01) |
| ***F16G 9/00*** | (2006.01) |

(52) U.S. Cl. ........ 187/251; 187/254; 187/266; 474/260; 474/264; 474/237

(58) Field of Classification Search .................. 474/260, 474/264, 237; 187/251, 254, 266
See application file for complete search history.

(56) References Cited

U.S. PATENT DOCUMENTS 1,035,230 A * 8/1912 Pearson ........................ 187/254
(Continued)

FOREIGN PATENT DOCUMENTS

| | | |
|---|---|---|
| JP | 08217366 | 8/1996 |
| JP | 08247221 A * | 9/1996 |
| WO | 0037738 | 6/2000 |

OTHER PUBLICATIONS

PCT International Search Report for International Application No. PCT/US03/03745 dated Sep. 2, 2003.

(Continued)

*Primary Examiner* — Michael R Mansen
*Assistant Examiner* — Henry Liu
(74) *Attorney, Agent, or Firm* — Carlson, Gaskey & Olds PC

(57) ABSTRACT

An elevator load bearing assembly (20) includes a plurality of cords (22) within a jacket (24). The jacket has a plurality of grooves (32, 34, 36, 38 40) spaced along the length of the belt assembly. Each groove has a plurality of portions (50, 52, 54, 56) aligned at an oblique angle (A, B) relative to a longitudinal axis (48) of the belt (20). In one example, the grooves are separated such that there is no longitudinal overlap between adjacent grooves. In another example, transitions (60, 64) between the obliquely aligned portions are at different longitudinal positions on the belt. Another example includes a combination of the different longitudinal positions and the non-overlapping groove placement.

17 Claims, 4 Drawing Sheets

U.S. PATENT DOCUMENTS

| | | | | |
|---|---|---|---|---|
| 3,776,054 | A | 12/1973 | Shichman et al. | |
| 4,034,615 | A * | 7/1977 | Brooks | 474/250 |
| 4,423,760 | A * | 1/1984 | Treves et al. | 152/209.21 |
| 5,215,504 | A * | 6/1993 | Wong et al. | 474/237 |
| 6,343,636 | B1 * | 2/2002 | Hanya et al. | 152/209.24 |
| 2002/0175055 | A1 | 11/2002 | Ryde | |
| 2003/0069101 | A1 * | 4/2003 | Pitts et al. | 474/260 |
| 2003/0092524 | A1 | 5/2003 | Baranda et al. | |
| 2003/0121729 | A1 | 7/2003 | Heinz et al. | |

OTHER PUBLICATIONS

Japanese Patent Office Action mailed Sep. 9, 2008, relating to Patent Application No. JP2004-568260.

Supplementary European Search Report for Application No. EP03815887 mailed Oct. 17, 2008.

* cited by examiner

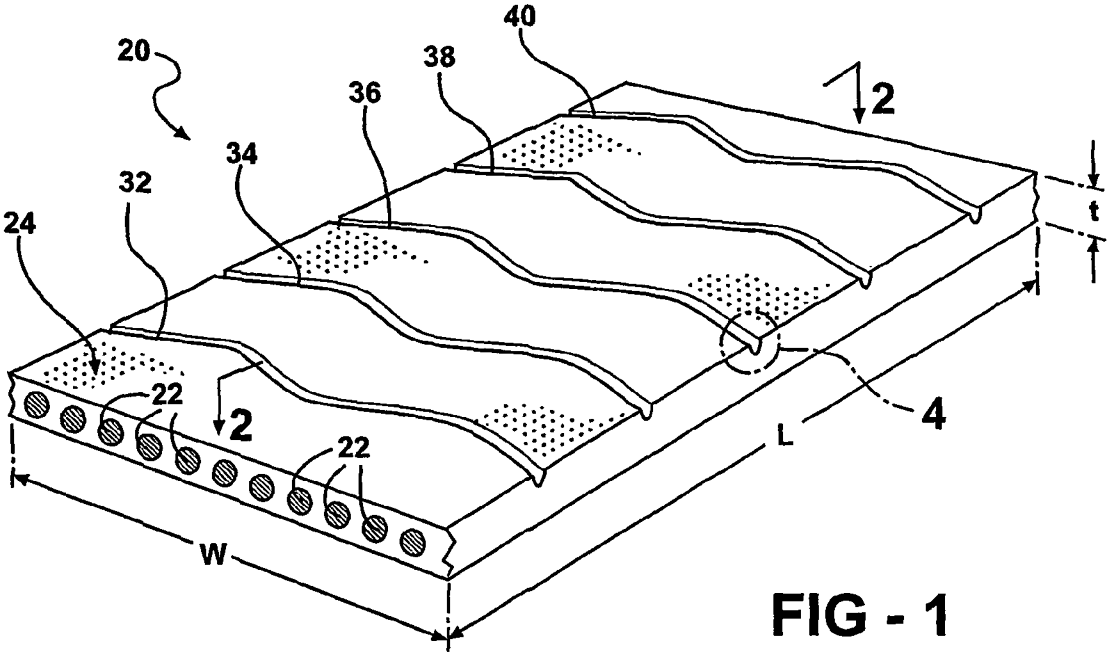
FIG - 1
FIG - 2
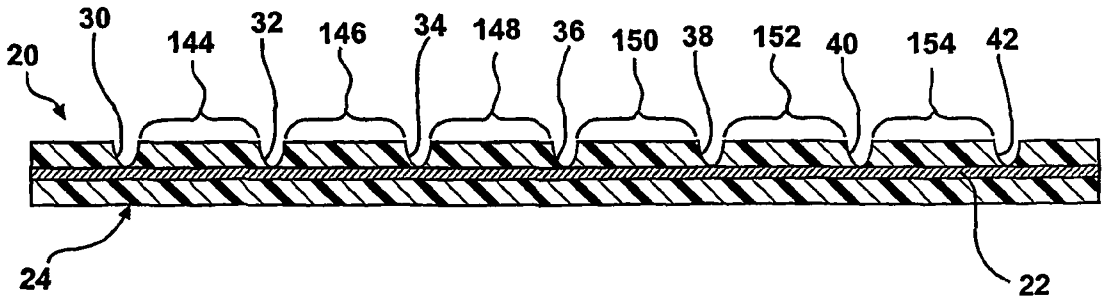

ELEVATOR BELT ASSEMBLY WITH NOISE REDUCING GROOVE ARRANGEMENT

BACKGROUND OF THE INVENTION

This invention generally relates to load bearing members for use in elevator systems. More particularly, this invention relates to an elevator belt assembly having a specialized groove arrangement.

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

One type of load bearing member is a coated steel belt. Typical arrangements include a plurality of steel cords extending along the length of the belt assembly. A jacket is applied over the cords and forms an exterior of the belt assembly. Some jacket application processes result in grooves being formed in the jacket surface on at least one side of the belt assembly. Some processes also tend to cause distortions or irregularities in the position of the steel cords relative to the exterior of the jacket along the length of the belt.

FIG. 7, for example, illustrates both of these phenomena. As can be seen, the spacing between the exterior of the jacket 200 and the cords 210 varies along the length of the belt. As can be appreciated from the illustration, the cords 210 are set within the jacket as if they comprise a series of cord segments of equal length corresponding to the groove spacing. FIG. 7 includes an exaggeration of the typical physical cord layout for purposes of illustration. The actual distortions or changes in the position of the cords relative to the jacket outer surfaces may not be discernable by the human eye in some examples.

When conventional jacket application processes are used, the manner in which the cords are supported during the jacket application process tends to result in such distortion in the geometry or configuration of the cords relative to the jacket outer surfaces along the length of the belt.

While such arrangements have proven useful, there is need for improvement. One particular difficulty associated with such belt assemblies is that as the belt moves in the elevator system, the grooves and the cord placement in the jacket interact with other system components such as the sheaves and generate undesirable noise, vibration or both. For example, as the belt assembly moves at a constant velocity, a steady state frequency of groove contact with the sheaves creates an annoying, audible tone. The repeated pattern of changes in the cord spacing from the jacket outer surfaces is believed to contribute to such noise generation.

An alternative arrangement is required to minimize or eliminate the occurrence of vibrations or an annoying tone during elevator system operation. This invention addresses that need.

SUMMARY OF THE INVENTION

In general terms, this invention is a belt assembly for use in an elevator system. The belt assembly includes a plurality of cords extending generally parallel to a longitudinal axis of the belt. A jacket over the cords includes a plurality of grooves that are configured and spaced to minimize the occurrence of any annoying audible noise during elevator operation.

One example belt designed according to this invention includes a plurality of grooves on at least one surface of the jacket. Each groove has a plurality of portions aligned at an oblique angle relative to the belt axis. Each groove has a transition between adjacent portions. Each groove has a plurality of such transitions and each transition is at a different longitudinal position on the belt.

In one example, the different longitudinal positions of the transitions are achieved by using different oblique angles for different portions of the groove. Having the transitions at different longitudinal positions reduces the noise-generating impact between the belt and sheaves in the elevator system.

Another example belt designed according to this invention includes a plurality of grooves on at least one surface of the jacket. Each groove has a plurality of portions aligned at an oblique angle relative to the belt axis. The grooves are spaced apart such that adjacent grooves are on opposite sides of a longitudinal position on the belt.

In one example, adjacent grooves are on opposite sides of an imaginary line that extends transverse to the belt axis. Such a spacing between the grooves avoids any overlap between any portion of a groove and an adjacent groove. Maintaining such spacing between grooves reduces the noise-generating energy associated with the impact between the grooves and a sheave as the belt wraps around a portion of the sheave during elevator system operation.

In one example, the grooves are longitudinally spaced such that spacings between the grooves vary along the length of the belt. Having different spacings between adjacent grooves eliminates the steady state frequency of groove contact with other system components, which is a major contributor to the potential for undesirable noise or vibration during elevator operation.

A belt assembly designed according to this invention may include the inventive spacing between grooves, the inventive angular alignment of groove segments or a combination of both. The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 schematically illustrates a portion of an example belt assembly designed according to an embodiment of this invention.

FIG. 2 is a cross-sectional illustration taken along the lines 2-2 in FIG. 1.

DETAILED DESCRIPTION

FIGS. 1 and 2 schematically illustrate a belt assembly 20 that is designed for use in an elevator system. A plurality of cords 22 are aligned generally parallel to a longitudinal axis of the belt assembly 20. In one example, the cords 22 are made of strands of steel wire.

A jacket 24 covers over the cords 22. The jacket 24 preferably comprises a polyurethane-based material. A variety of such materials are commercially available and known in the art to be useful for elevator belt assemblies. Given this description, those skilled in the art will be able to select a proper jacket material to suit the needs of their particular situation.

The jacket 24 establishes an exterior length, L, width, W, and a thickness, t, of the belt assembly 20. In one example, the width W of the belt assembly is 60 millimeters, the thickness t is 3 millimeters and the length L is dictated by the particular system where the belt will be installed. In the same example, the cords 22 have a diameter of 1.65 millimeters. In this example, there are twenty-four cords. The cords 22 preferably extend along the entire length L of the assembly.

The jacket 24 includes a plurality of grooves 30, 32, 34, 36, 38, 40 and 42 on at least one side of the jacket 24. In the illustrated example, the grooves extend across the entire width of the belt assembly.

The grooves result from some manufacturing processes, many of which are well known in the art, that are suitable for forming the belt assembly 20. As can best be appreciated from FIG. 2, the grooves extend between an exterior surface of the jacket 24 and the surface of the cords 22 facing the same exterior surface of the jacket.

Figure 3:
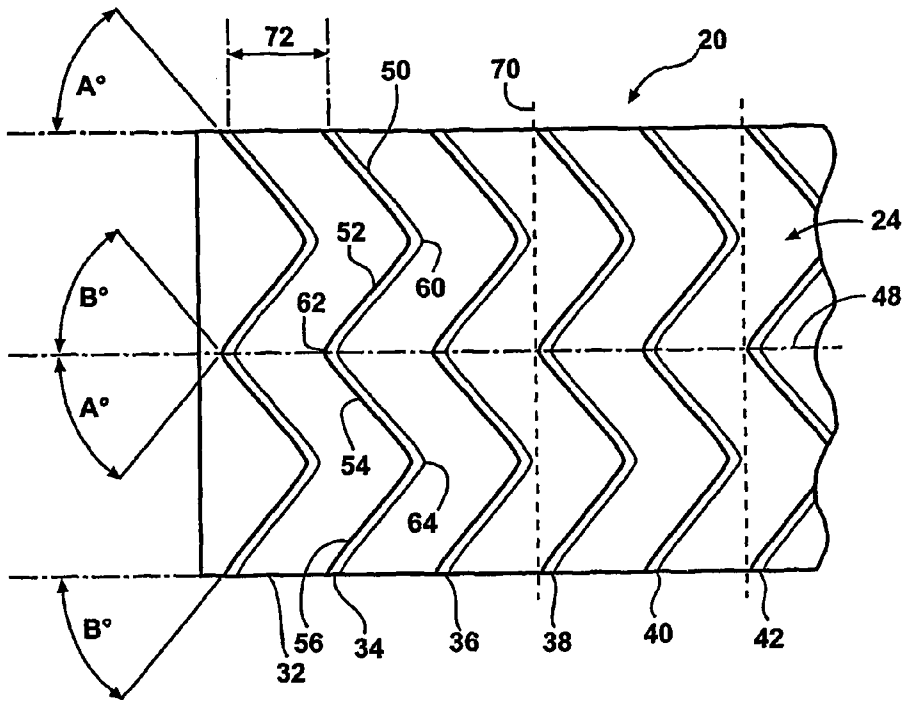
FIG. 3 is a planar, schematic illustration of the groove arrangement of the embodiment of FIG. 1 showing selected geometric features.

Referring to FIGS. 1 and 3, this example embodiment has grooves that are generally W-shaped. Each groove includes a plurality of portions that are aligned at an oblique angle relative to the longitudinal axis 48 of the belt. Taking the groove 34 as an example, a first portion 50 extends at an oblique angle A in a first longitudinal direction. A second portion 52 extends in an opposite longitudinal direction at the oblique angle A. A third portion 54 extends in the same direction as the first portion 50 but at a second oblique angle B. A fourth portion 56 extends in an opposite longitudinal direction at the second oblique angle B.

In one example, the angle A is approximately 50°. In the same example, the angle B is approximately 53.5°. Utilizing different oblique angles for different portions of the groove allows for strategic positioning of transitions between the obliquely aligned portions.

The groove 34 in FIG. 3, for example, has a first transition 60, a second transition 62 and a third transition 64. Each transition joins two adjacent obliquely angled portions of the groove. Because the first oblique angle A is different than the second oblique angle B, the longitudinal position of the transition 60 is different than the longitudinal position of the transition 64. "Longitudinal position" as used in this description refers to a position on the belt along the length of the belt (i.e., in a direction parallel to the axis 48).

For example, the distance between the line 70, which extends transverse to the belt axis 48 across the width of the belt, and the transition 60 is different than the distance between the line 70 and the transition 64. In this example, the transition 60 is closer to the line 70 than the transition 64 because the angle A is smaller than the angle B. The line 70 is provided for discussion purposes and does not indicate a physical line on the belt.

Keeping the transitions at different longitudinal positions effectively changes the phase of the two halves of the groove. Having the transitions out of phase tends to cancel the energy associated with contact between the transitions and sheaves. Therefore, the inventive arrangement reduces vibration and noise in an elevator system.

As shown in the illustrated example, the transitions are essentially peaks along the groove. In this example, each transition is curvilinear. Having a curved transition between obliquely angled portions of the grooves that extend in opposite directions reduces the vibration and noise-generating impact energy associated with the grooves contacting a sheave in the elevator system.

As can be appreciated from FIG. 3, in the illustrated example, the portions 50, 52, 54 and 56 are linear over the majority of their length. The linear portions are aligned at the selected oblique angle or angles, depending on the desired groove configuration. This invention is not limited to a belt having grooves with truly linear portions. In an example assembly where the portions are at least somewhat curvilinear, tangent lines associated with such a curvilinear portion preferably are at selected oblique angles relative to the belt axis.

In the example of FIG. 3, the spacing 72 between adjacent grooves (i.e., between the groove 32 and the groove 34, between the groove 34 and the groove 36 and between the groove 36 and the groove 38, respectively) is selected such that there is no overlap between any portion of any adjacent groove. Considering the line 70 as indicating a longitudinal position on the belt 20, the grooves 36 and 38 are on opposite sides of the line 70. Accordingly, there is no overlap between any portion of the groove 36 and any portion of the groove 38. Keeping the entire groove 36 longitudinally spaced from the entire groove 38 reduces the vibration and noise-generating energy associated with the impact between the grooves and a sheave during elevator system operation.

The spacing 72 between the grooves preferably prevents any overlap between adjacent grooves along the entire length of the belt. In some examples, the spacing 72 may be consistent along the entire length of the belt. In other examples, the spacing 72 varies between grooves in a selected pattern as will be described below.

Figure 4:
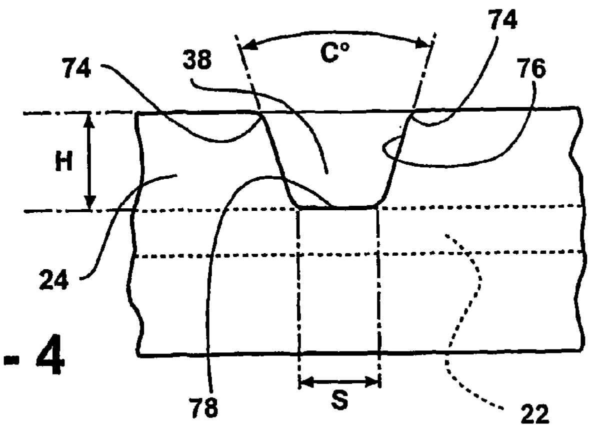
FIG. 4 is an enlarged view of the encircled portion of FIG. 1, which schematically illustrates an example groove cross sectional configuration.

In addition to the different longitudinal positions of the transitions and the absence of any longitudinal overlap between adjacent grooves, a belt designed according to this invention may include further vibration and noise reducing features. FIG. 4, for example, shows one embodiment of a groove configuration where the interface between the groove and the exterior surface on the jacket 24 includes a rounded edge or fillet 74. Using such a rounded edge 74 reduces the vibration and noise producing energy associated with the impact between the groove and a surface on a sheave in the elevator system. In this example, the fillets 74 have a radius of curvature that is in a range from about 0.05 to 0.15 millimeters.

In the example of FIG. 4, sidewalls 76 of the groove 38 extend from the exterior surface of the jacket 24 to the bottom 78 of the groove, which is directly adjacent a surface of the cords 22. The intersections between the sidewalls 76 and the bottom 78 in this example include rounded surfaces having the same radius of curvature as the fillets 74.

In one example, a 0.1 millimeter radius of curvature is used for the fillets 74 and the transitions between the sidewalls and the bottom 78. One example arrangement has the sidewalls 76 arranged at an angle C that is approximately 30°. An example height of the groove is 0.7 millimeters and an example width S of the groove is 0.7 millimeters.

The configuration of the grooves is dictated in some examples by the shape of the cord supports used during the belt manufacturing process. Those skilled in the art who have the benefit of this description will be able to select from among commercially available materials used for making jackets on elevator belts and be able to configure the manufacturing equipment or other groove-forming equipment to achieve the desired groove profile to meet the needs of their particular situation.

Figure 5:
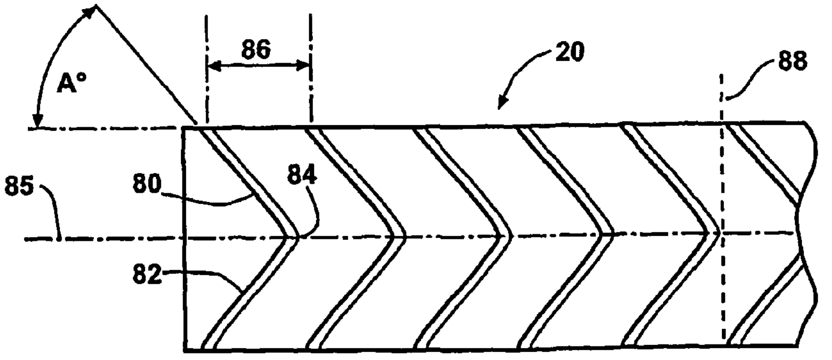
FIG. 5 schematically illustrates an alternative groove arrangement.

FIG. 5 shows another example belt 20 designed according to this invention. In this example, each groove has only two portions 80 and 82 extending in opposite longitudinal directions but at the same oblique angle A. A single transition 84 joins the portions 80 and 82. In this example, both portions 80 and 82 extend at the same angle A and the transition 84 is aligned at the center line 85, which is coincident with the longitudinal axis of the belt. Of course, other configurations are within the scope of this invention.

In this example, the space 86 between adjacent grooves is selected so that adjacent grooves are on opposite sides of a longitudinal position on the belt 20. For example, the line 88 indicates a longitudinal position, which is taken transversely to the axis 85 of the belt. In one example, such a line could be drawn between every set of adjacent grooves and there would be no longitudinal overlap between the grooves because each groove would be on an opposite side of such a line. Arranging the grooves to avoid longitudinal overlap reduces the energy associated with impact between the grooves and the surface of a sheave in an elevator system.

In one example, an embodiment such as that shown in FIG. 5 is used for a belt having a width W that is approximately 30 millimeters while a belt having a configuration like that shown in FIG. 3 is used for a belt with W of approximately 60 millimeters. The selection of belt width depends, in part, on the expected duty loads for the elevator system in which the belt will be employed.

Figure 6:
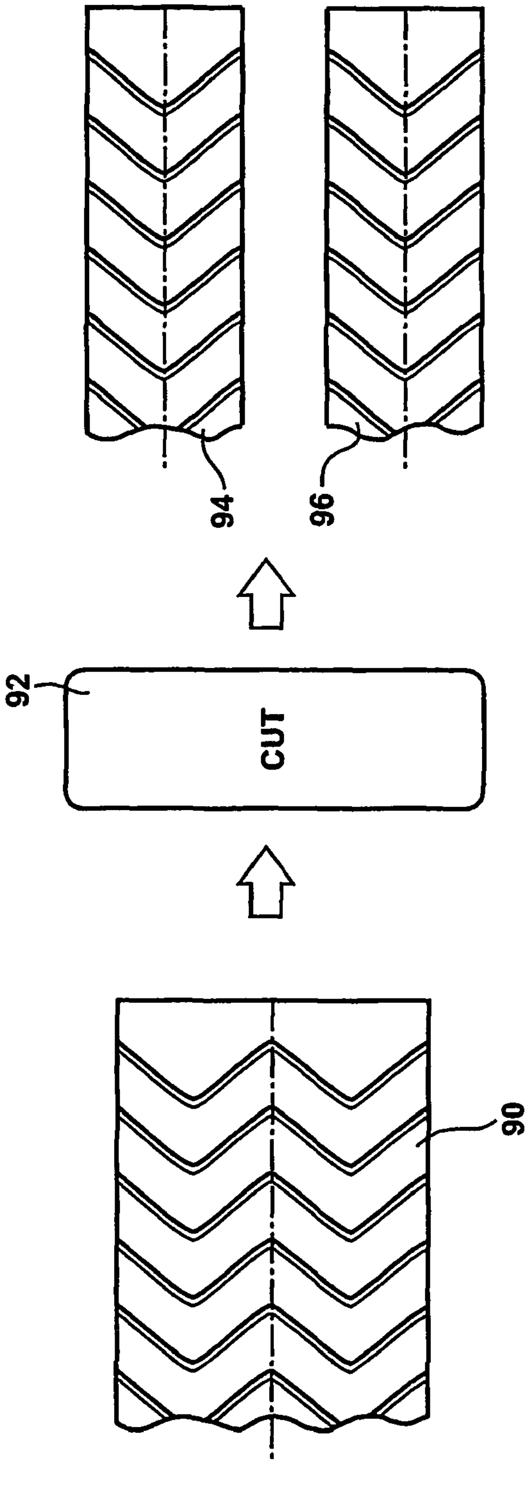
FIG. 6 schematically illustrates a method of making a belt designed according to an embodiment of this invention.
Figure 7:
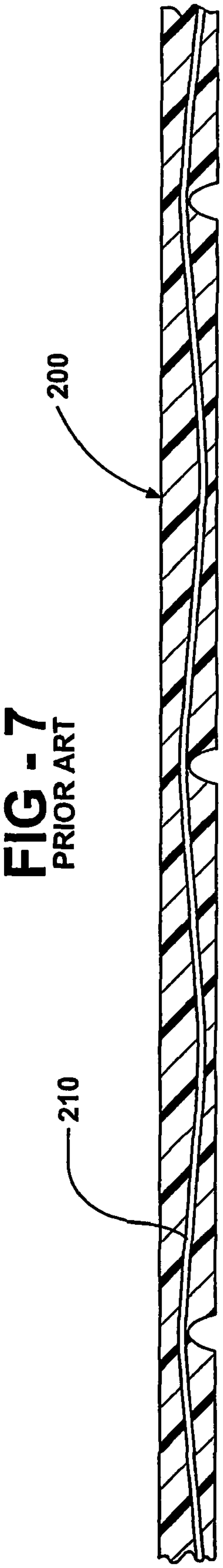
FIG - 7 PRIOR ART
FIG. 7 schematically illustrates a typical cord geometry relative to outer surfaces on a belt jacket according to the prior art.
Figure 8:
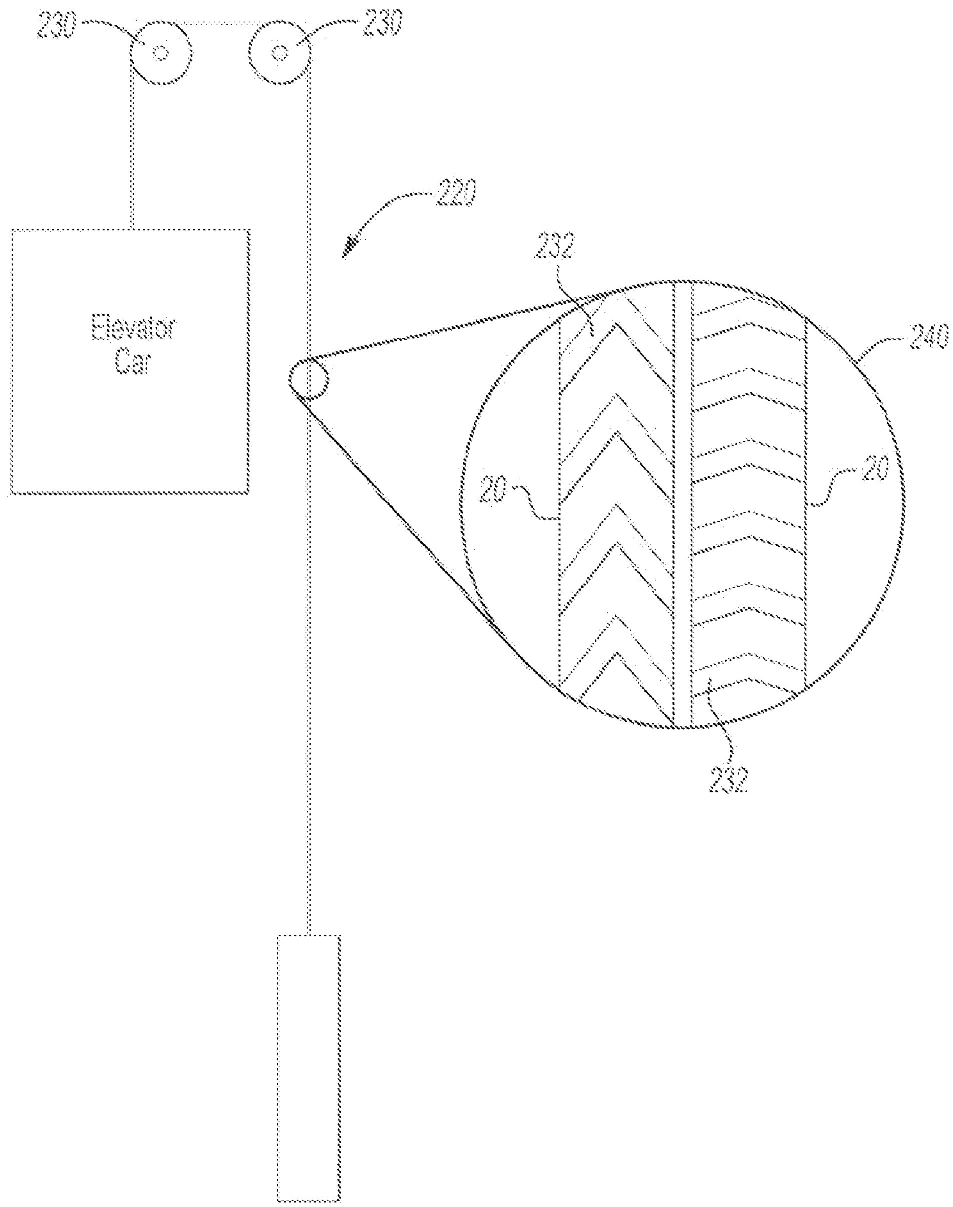
FIG. 8 schematically illustrates selected portions of an example elevator system.

FIG. 6 schematically illustrates one example method of making elevator belts designed according to this invention. A 60 millimeter wide belt 90 having a groove configuration as shown in the embodiment of FIG. 3, for example, is cut in half along the longitudinal axis of the belt using a cutting station 92. Two belts 94 and 96 result, which have configurations as shown in FIG. 5, for example. This strategy for making elevator belts allows for the same manufacturing equipment to be used to produce belts having a 60 millimeter wide width and 30 millimeter wide width, for example.

One example elevator system 220 that includes belts 20 designed according to this invention includes a plurality of belts 20 in parallel that move simultaneously over the sheaves 230. The plurality of belts in this example include obliquely angled groove portions 232 that are different angles for at least two of the belts as shown at 240. Having different oblique angles on the belts provides the benefit of keeping the transitions on one belt at different longitudinal positions than the transitions on another belt. Such longitudinal positioning effectively changes the phase of at least the two belts having different oblique angles. Having the transitions out of phase allows for the energy associated with contact between the transitions on one belt and the sheaves to effectively cancel out the energy associated with such contact between the sheaves and the other belt.

In one example, every belt has groove portions angled at a different oblique angle than the other belts. In another example, the same oblique angle is used on the belts, however, the belts are aligned relative to each other in the system such that the groove transitions on one belt are at different longitudinal positions than the groove transitions on at least one other belt.

An additional vibration and noise reducing feature of a belt designed according to some example embodiments of this invention includes having the grooves spaced apart different distances so that there are different spacings between various grooves. Referring to FIG. 2, for example, a first spacing 144 separates the groove 30 from the adjacent groove 32. A different spacing 146 separates the groove 32 from the adjacent groove 34. Similarly, at least some of the spacings 148, 150, 152 and 154 vary in size.

It is not necessary that all of the illustrated spacings are different, however, it is preferred to provide at least several different spacings along the length of the belt assembly. As a practical matter, a repeated pattern of the varying spacings will typically extend along the entire length of the belt assembly 20. Depending on the particulars of the belt assembly and the equipment used to form and apply the jacket 24, the pattern of different spacings will repeat at different intervals. Preferably, the interval of pattern repetition will be as large as the manufacturing equipment allows. In one example, there is a selected pattern of different spacings that repeats about every fifty grooves or every two meters of belt length. Within each two meter section, the spacings between adjacent grooves are selected to be varying and non-periodic.

In one example embodiment, the spacings between the grooves are selected to be 13.35 millimeters, 12.7 millimeters and 11.8 millimeters. Such spacings preferably are used in a non-periodic, non-repeating pattern over a length of the belt that includes approximately fifty grooves. In one example, the pattern established by the belt manufacturing equipment repeats after every $47^{th}$ groove. In another example embodiment, the spacings are selected from 11.2 millimeters, 12.1 millimeters and 12.7 millimeters. Those skilled in the art who have the benefit of this description will be able to select appropriate groove spacings to achieve the desired level of smoothness and quietness to meet the needs of their particular situation.

In one example, modeling is used to determine the selected spacing dimensions and pattern. The effects of the grooves are characterized with a complex waveform to approximate the input disturbance energy. The complex waveform in one example is determined by sampling belt performance and developing a suitable function that corresponds to the sampled belt behavior. This input function is included for each cord (i.e., each belt segment between adjacent grooves). The summation of the functions are based on the relative phase of the cords. The overall energy is the sum of each cord's contribution. Therefore, the phasing of the cords (i.e., spacings between grooves) determines the overall magnitude. A Fast Fourier analysis provides an assessment of the relative overall energy level resulting from the belt.

By altering spacings between adjacent grooves, the noise component, caused by contact of the belt assembly with other elevator system components, such as the sheaves, during system operation, is spread over a broader range of frequencies. Thus, steady state frequencies of noise are avoided which eliminates the potential for an audible, annoying tone.

In addition to varying the spacing between the grooves, the inventive arrangement provides the ability to vary the lengths of cord "segments," which result from certain manufacturing techniques (but are not necessarily included in the inventive arrangement). A belt assembly designed according to this invention may include a series of cord segments along which the distance between the cord and the jacket outer surfaces varies. The ends of such cord "segments" coincide with the location of the grooves. Varying the spacing of the grooves also varies the length of the segments and therefore varies the pattern of the cord geometry relative to the jacket outer surfaces. With some example uses of the inventive techniques, the length of the cord segments varies along the length of the belt.

Because the segments of cord extending between adjacent grooves are of various lengths, there is no periodic, repeated geometric pattern of the cords relative to the jacket outer surfaces. By varying the length of the cord segments (i.e., changing spacing between similar distortions in the position of the cord relative to the jacket outer surfaces) any contribution to noise or vibration caused by the cord geometry, is reduced or eliminated. By eliminating the periodic feature of the cord geometry, this invention provides a significant advantage for reducing vibration and noise generation during elevator system operation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator belt for supporting weight associated with an elevator car and at least partially wrapping about a sheave that moves to cause movement of the elevator car, comprising:

a plurality of cords aligned generally parallel to a longitudinal axis of the belt, the cords being adapted to support the weight associated with the elevator car, the cords being spaced apart from each other in a width direction across the belt; and a jacket over the cords, the jacket including a plurality of V-shaped grooves on at least one surface of the jacket that extends across the width direction of the belt and is adapted to contact the sheave, each groove having only two portions each at an oblique angle relative to the belt axis, the portions each having one end at an edge of the jacket and an opposite end at a middle region of the at least one surface, with the opposite ends of the portions intersecting each other at an angle to form a peak of the V-shape, the two portions of each groove together extending across the entire one surface in the width direction of the belt, the grooves being spaced apart such that adjacent grooves are on opposite sides of a longitudinal position on the belt, the jacket comprising an uninterrupted surface across an entire spacing between each one of the V-shaped grooves and a next one of the V-shaped grooves longitudinally adjacent the one of the V-shaped grooves, the uninterrupted surface having a first surface edge consisting of only two segments at an edge of the one of the V-shaped grooves and a second surface edge consisting of only two segments at an edge of the next one of the V-shaped grooves, the first surface edge and the second surface edge being parallel to each other along an entire length of the edges, the first surface edge and the second surface edge being oriented the same as each other in a longitudinal direction along the belt.

2. The belt of claim 1, wherein the belt width extends in a direction generally perpendicular to the longitudinal axis between one lateral edge on the belt and an opposite lateral edge on the belt.

3. The belt of claim 1, wherein the longitudinal position extends along a line transverse to the longitudinal axis.

4. The belt of claim 1, wherein every portion of every groove is on the opposite side of the longitudinal position from every portion of every adjacent groove.

5. The belt of claim 1, wherein every portion of each groove is at the same oblique angle.

6. The belt of claim 1, wherein each of the portions is linear and at least a first one of the linear portions is at a first oblique angle and at least a second one of the linear portions is at a second oblique angle.

7. The belt of claim 6, wherein each groove has a transition between the adjacent portions, and wherein at least two of the transitions are at different longitudinal positions on the belt.

8. The belt of claim 1, wherein each groove has a transition at the peak of the V-shape and wherein the peak is at least partially curvilinear.

9. The elevator belt of claim 1, wherein each of the portions has a first edge along one side of the portion on the one surface of the jacket and a second edge along an opposite side of the portion on the one surface of the jacket.

10. The elevator belt of claim 9, wherein the first edges intersect to form one edge of the peak of the V shape and the second edges intersect to form an opposite edge of the peak of the V shape.

11. An elevator system, comprising:

a car that is moveable in a selected vertical direction;

at least one sheave; and a plurality of belts that at least partially wrap around the sheave and move about the sheave as the car moves in the selected direction, the belts being parallel to each other and moving at the same speed as the car moves in the selected direction, each belt having a plurality of cords aligned generally parallel to a longitudinal axis of the belt and a jacket over the cords, the jacket of each belt including a plurality of grooves on at least one surface of the jacket that engages the at least one sheave, each groove having a plurality of portions at an oblique angle relative to the belt axis, each groove having at least one transition between adjacent portions, the transitions on a first one of the belts being at different longitudinal positions than the transitions on a second one of the belts such that the transitions on the first one of the belts contact the sheave at a different time than the transitions on the second one of the belts contact the sheave as the car moves in the selected direction, every one of the grooves on the first one of the belts including one portion extending longitudinally at a first oblique angle and another portion extending longitudinally in an opposite direction at a second oblique angle, every one of the grooves on the second one of the belts including one portion extending longitudinally at a third oblique angle and another portion extending longitudinally in an opposite direction at a fourth oblique angle, wherein the first oblique angle is different than the second oblique angle.

12. The system of claim 11, wherein the transitions on at least one of the belts are curvilinear.

13. The system of claim 11, wherein the grooves on at least one of the belts are spaced apart such that adjacent grooves are on opposite sides of a longitudinal position between the adjacent grooves.

14. The belt of claim 13, wherein every portion of every groove is on the opposite side of the longitudinal position from every portion of every adjacent groove.

15. An elevator belt for supporting weight associated with an elevator car and at least partially wrapping about a sheave that moves to cause movement of the elevator car, comprising:

a plurality of cords aligned generally parallel to a longitudinal axis of the belt, the cords being spaced apart from each other in a width direction across the belt, the cords being adapted to support the weight associated with the elevator car; and a jacket over the cords, the jacket including a plurality of W-shaped grooves on at least one surface of the jacket that extends across the width direction of the belt and is adapted to contact the sheave, each groove having four portions each at an oblique angle relative to the belt axis, two of the portions having one end at an edge of the jacket, and an opposite end at the middle region and intersecting an end of an adjacent one of the portions at an angle to form a peak of the W-shape, the four portions of each groove together extending across the entire one surface in the width direction of the belt, the grooves being spaced apart such that adjacent grooves are on opposite sides of a longitudinal position on the belt, wherein no other groove portions intersect with the W-shaped grooves such that the jacket comprises an uninterrupted surface across an entire spacing between each one of the W-shaped grooves and a next one of the W-shaped grooves longitudinally adjacent the one of the W-shaped grooves, the uninterrupted surface having a first surface edge consisting of only four segments at an edge of the one of the W-shaped grooves and a second surface edge consisting of only four segments at an edge of the next one of the W-shaped grooves, the first surface edge and the second surface edge being parallel to each other along an entire length of the edges, the first surface edge and the second surface edge being oriented the same as each other in a longitudinal direction along the belt.

16. The elevator belt of claim 15, wherein each of the portions has a first edge along one side of the portion on the one surface of the jacket and a second edge along an opposite side of the portion on the one surface of the jacket.

17. The elevator belt of claim 16, wherein the first edges of two adjacent portions intersect to form one edge of one of the peaks of the W-shape and the second edges of the two adjacent portions intersect to form an opposite edge of the peak of the W-shape.

* * * * *